(12) United States Patent
Rizk et al.

(10) Patent No.: US 9,280,565 B1
(45) Date of Patent: Mar. 8, 2016

(54) SYSTEMS, METHODS, AND COMPUTER PROGRAM PRODUCTS FOR DISPLAYING IMAGES

(71) Applicant: EyeEM Mobile GmbH, Berlin (DE)

(72) Inventors: Ramzi Rizk, Berlin (DE); Appu Shaji, Berlin (DE)

(73) Assignee: EyeEm Mobile GmbH., Berlin (DE)

( * ) Notice: Subject to any disclaimer, the term of this patent is extended or adjusted under 35 U.S.C. 154(b) by 0 days.

(21) Appl. No.: 14/506,097

(22) Filed: Oct. 3, 2014

Related U.S. Application Data

(63) Continuation-in-part of application No. 14/506,103, filed on Oct. 3, 2014.

(51) Int. Cl.
*G06K 9/54* (2006.01)
*G06F 17/30* (2006.01)
*G06T 11/60* (2006.01)

(52) U.S. Cl.
CPC ...... *G06F 17/3028* (2013.01); *G06F 17/30256* (2013.01); *G06F 17/30268* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 5,493,677 A * | 2/1996 | Balogh | G06F 17/3025 382/305 |
| 8,594,385 B2 | 11/2013 | Marchesotti et al. | |
| 8,755,596 B2 | 6/2014 | Datta et al. | |
| 2006/0242139 A1 | 10/2006 | Butterfield et al. | |
| 2007/0270985 A1 * | 11/2007 | Shellshear | G06F 3/0481 700/87 |
| 2007/0288435 A1 * | 12/2007 | Miki | G06F 17/3025 |

OTHER PUBLICATIONS

Achanta et al. "Slic superpixels compared to state-of-the-art superpixel methods," IEEE Transactions on Pattern Analysis and Machine Intelligence, vol. 34(11):2274-2281, 2012, (Published before this application Oct. 2014).
Burges "From RankNet to LambdaRank to LambdaMART: An overview," Microsoft Research Technical Report MSR-TR-2010-82, 2010, 19 pages, (published before this application Oct. 2014).
Chatterjee, The Aesthetic Brain. Oxford University Press, 2014, 244 pages, (Jan. 2014).
Dalal et al. "Histograms of oriented gradients for human detection," in Proceedings of Computer Vision and Pattern Recognition, 2005, 8 pages, (published before this application Oct. 2014).
Hunter "Photoelectric color difference meter," Josa, vol. 48(12):985-993, 1958, (published before this application Oct. 2014).

(Continued)

*Primary Examiner* — Eueng-Nan Yeh
(74) *Attorney, Agent, or Firm* — Rothwell, Figg, Ernst & Manbeck, P.C.

(57) ABSTRACT

A system, method, and computer program product for displaying a plurality of images. A method of the present invention includes storing image-associated metadata for each image. The method further includes storing user-associated metadata for each user. The method further includes creating a graph comprising the plurality of images, based on the image-associated and user-associated metadata. The method further includes processing the plurality of images based on the graph to generate a subset of the plurality of images. The method further includes displaying the subset of the plurality of images.

17 Claims, 15 Drawing Sheets

(56) References Cited

OTHER PUBLICATIONS

Koenderink "The structure of images," Biological Cybernetics, vol. 50:363-370, 1984, (published before this application Oct. 2014).
Lowe "Object recognition from local scale-invariant features," in Computer Vision, 1999. The proceedings of the seventh IEEE international conference on, vol. 2, 8 pages, (published before this application Oct. 2014).
Perronnin et al. "Large-scale image retrieval with compressed fisher vectors," in Computer Vision and Pattern Recognition (CVPR), 2010 IEEE Conference on IEEE, 8 pages, (published before this application Oct. 2014).
Weston et al. "Wsabie: Scaling up to large vocabulary image annotation," in IJCAI, vol. 11, 7 pages, 2011, (published before this application Oct. 2014).

\* cited by examiner

Search can be accessed from multiple screens within the mobile application:
FIG. 15a
FIG. 15b
FIG. 15c

SYSTEMS, METHODS, AND COMPUTER PROGRAM PRODUCTS FOR DISPLAYING IMAGES

CROSS REFERENCE TO RELATED APPLICATION(S)

This application is a continuation-in-part of, and claims priority to, U.S. application Ser. No. 14/506,103, entitled "SYSTEMS, METHODS, AND COMPUTER PROGRAM PRODUCTS FOR SEARCHING AND SORTING IMAGES BY AESTHETIC QUALITY", filed Oct. 3, 2014. The content of this application is incorporated herein by reference.

TECHNICAL FIELD

The present invention relates generally to systems, methods, and computer program products for displaying images. More particularly, the present invention relates to processing and displaying a plurality of images based on image-associated and user-associated metadata.

BACKGROUND OF THE INVENTION

In conventional image display applications, it is difficult to view and search large collections of images, in a way that identifies the most interesting, relevant, or aesthetically pleasing images. Existing systems are limited in that they do not provide a useful way to sort or search by aesthetic quality, do not consider the relationship between a user and the quality or interestingness of images associated with that user, and otherwise use a limited set of user- and image-associated metadata to rank images.

There is a need for a system, method, and computer program product that processes a set of images, and that allows for sets of images to be displayed, ordered, and searched based on useful user- and image-associated metadata.

SUMMARY OF THE INVENTION

The present invention is directed to systems, methods, and computer program products for displaying a set of images. The displayed images may be based on a search query and may be recommended based on information known about a specific user.

Particular embodiments of the present invention are directed to systems, methods, and computer program products for processing and displaying a plurality of images based on a graph.

In one particular embodiment, a method for displaying a plurality of images includes storing image-associated metadata for each image. The image-associated metadata comprises a photographer identifier, an aesthetic score, and at least one of a plurality of tags, a plurality of albums, a plurality of comments, a location information, a time information, a weather information, a plurality of event information wherein the event information concerns events that occurred near at least one of the location information and the time information, a history of views, a history of likes, a history of purchase, and a plurality of computer-generated information. The method further includes storing user-associated metadata for each user. The user-associated meta-data comprises a photographer score, an aggregate-image score, a plurality of impact scores, and at least one of a gender, an age, and an activity history. The method further includes creating a graph comprising the plurality of images based on the image-associated metadata and the user-associated metadata. The method further includes processing the plurality of images based on the graph to generate a subset of the plurality of images. The method further includes displaying the subset of the plurality of images.

In some embodiments, the processing the plurality of images comprises receiving a search query from a user and generating a rank-sorted list of images based on the search query, where the order is based on the image-associated metadata, the user-associated metadata, and the graph. In some embodiments the rank-sorted list of images may further be filtered.

In some embodiments, the processing the plurality of images comprises receiving a request from a user and generating a recommendation to the user in response to the request, based on the graph and the image-associated and user-associated metadata. In some embodiments, the recommendation may be a set of photographer-identifiers, images, or users. In some embodiments, the recommendation may be sorted based on information known about the user. In some embodiments, the request from a user may be a search request. In some embodiments, the recommendation may be additionally based on user-associated metadata belonging to the user.

In some embodiments, the processing the plurality of images comprises identifying a subset of the set of images and sorting the set based on the aesthetic scores associated with the set of images. In some embodiments the identified subset of images will consist of images with similar image-associated metadata, including tags or location information.

In one particular embodiment, a device for displaying a plurality of images comprises a processor, a memory coupled to the processor, a network interface coupled to the processor, and a plurality of images. The processor is further configured to store, for each image, image-associated metadata. The image-associated metadata comprises a photographer identifier, an aesthetic score, and at least one of a plurality of tags, a plurality of albums, a plurality of comments, a location information, a time information, a weather information, a plurality of event information wherein the event information concerns events that occurred near at least one of the location information and the time information, a history of views, a history of likes, a history of purchase, and a plurality of computer-generated information. The processor is further configured to store, for each user, user-associated metadata. The user-associated meta-data comprises a photographer score, an aggregate-image score, a plurality of impact scores, and at least one of a gender, an age, and an activity history. The processor is further configured to create a graph comprising the plurality of images, wherein the graph is based on the image-associated metadata and the user-associated metadata. The processor is further configured to process the plurality of images based on the graph to generate a subset of the plurality of images. The processor is further configured to display the subset of the plurality of images.

In one particular embodiment, a computer program product for displaying a plurality of images comprises a non-transitory computer readable medium storing computer readable program code embodied on the medium. The computer program product further comprises a plurality of images. The computer program product further comprises program code for storing, for each image, image-associated metadata. The image-associated metadata comprises a photographer identifier, an aesthetic score, and at least one of a plurality of tags, a plurality of albums, a plurality of comments, a location information, a time information, a weather information, a plurality of event information wherein the event information concerns events that occurred near at least one of the location information and the time information, a history of views, a history of likes, a history of purchase, and a plurality of computer-generated information. The computer program product further comprises program code for storing, for each user, user-associated metadata. The user-associated metadata comprises a photographer score, an aggregate-image score, a plurality of impact scores, and at least one of a gender, an age, and an activity history. The processor is further configured to create a graph comprising the plurality of images, wherein the graph is based on the image-associated metadata and the user-associated metadata. The computer program product further comprises program code for creating a graph comprising the plurality of images, wherein the graph is based on the image-associated metadata and the user-associated metadata. The computer program product further comprises program code for processing the plurality of images based on the graph to generate a subset of the plurality of images. The computer program product further comprises program code for displaying the subset of the plurality of images.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIGS. 15a-c are exemplary screens of a smartphone application in accordance with exemplary embodiments of the present invention.

DETAILED DESCRIPTION

Referring to FIGS. 1-15c, exemplary methods, systems, and computer program products for displaying images are provided.

Figure 1:
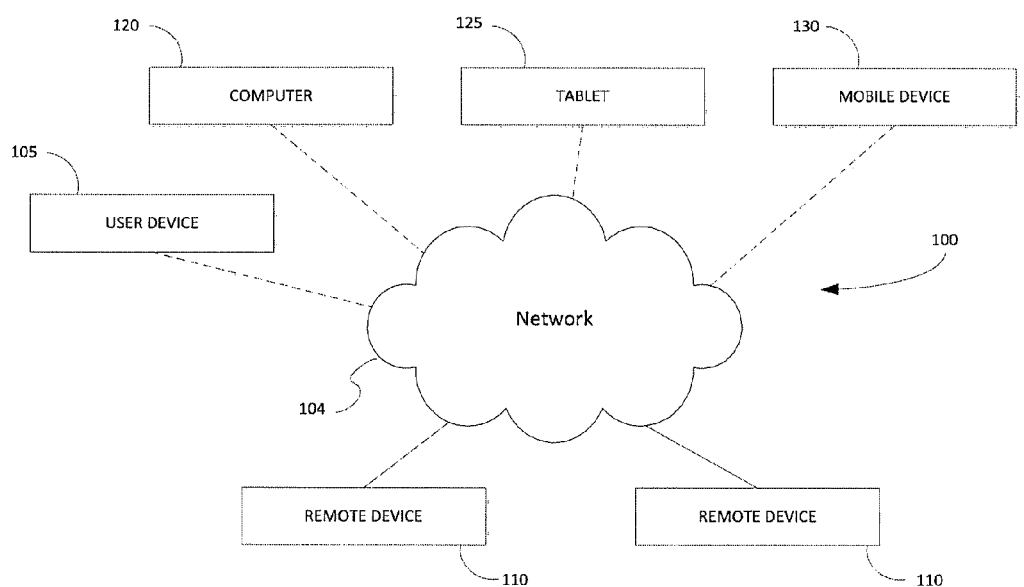
FIG. 1 illustrates an exemplary architecture of a communication system in accordance with exemplary embodiments of the present invention.

Referring now to FIG. 1, an exemplary architecture of a communication system in accordance with embodiments of the present invention is illustrated. System 100 includes at least one remote device 110 that is configured to communicate with one or more user devices 105 through a communications network 104 (e.g., the internet). Examples of user devices include a computer 120 (e.g., laptop or desktop), a tablet 125 (e.g., an iPad), and a mobile device 130 (e.g., a smartphone, such as, for an example, an iPhone). An example of a remote device 110 includes a server. The system, method and computer program product of the present invention can, for example, be deployed as a user/client-server implementation, as an ASP model, or as a standalone application running on a user device 105.

The user device 105 can be configured to communicate with one or more remote devices 110 via the network 104. Remote devices 110 are configured to generate, maintain, and host the computer program product in one embodiment. The remote devices 110 generate, maintain and host web pages (e.g., HTML documents) that embody the present invention. The remote devices 110 include services associated with rendering dynamic web pages, such as data storage services, security services, etc. Accordingly, remote devices 110 can include a conventional hardware arrangement and can be outfitted with software and/or firmware for performing web server functions for performing aspects of the present invention, such as, for example, javascript/jquery, HTML5, CSS2/3, and facilities for SSL, MySQL, PHP, SOAP, etc.

Remote devices 110 may be coupled with a data storage facility, which may include one or more local or remote memory systems or units, and can include one or more databases and/or file systems for storing data, media, graphics, HTML documents, XML documents, etc.

Remote devices 110 can be configured to include an admin function, which enables an administrator to perform system-related functions. The system-related functions can include maintaining user records, performing upgrades on the software and topic content, and the moderation of tasks.

Figure 2:
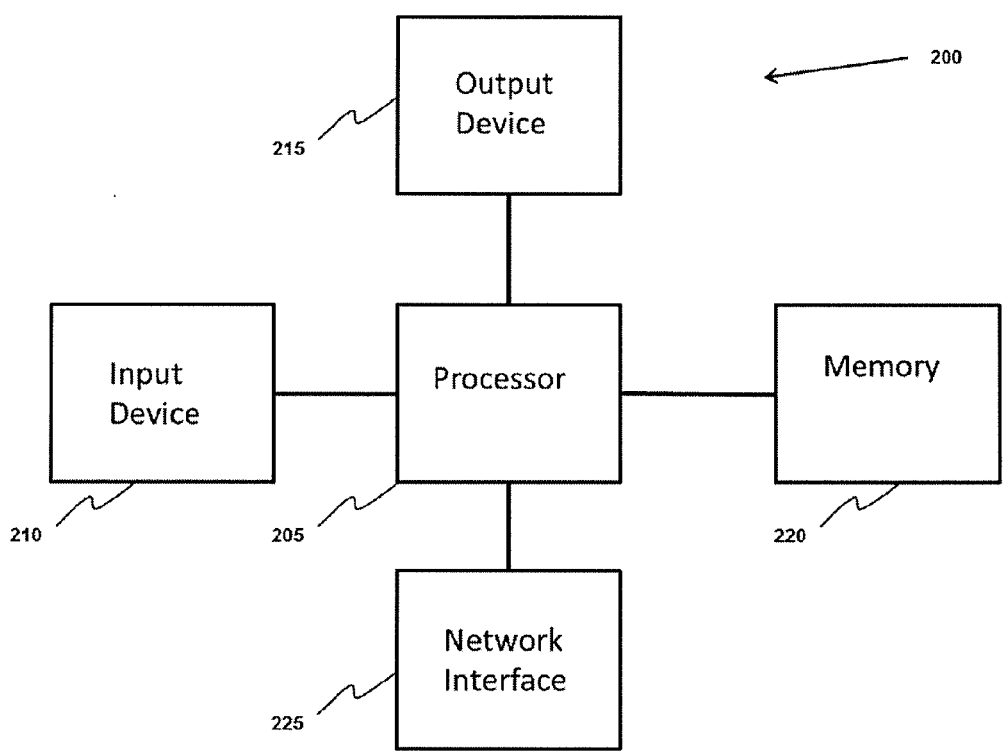
FIG. 2 is a block diagram of a user device in accordance with exemplary embodiments of the present invention.

Referring to FIG. 2, a block diagram of a device 200, such as for example, user device 105, computer 120, tablet 125, and mobile device 130, in accordance with exemplary embodiments of the present invention is illustrated. As shown in FIG. 2, the device 200 may include a processor 205, which may include one or more microprocessors and/or one or more circuits, such as an application specific integrated circuit (ASIC), field-programmable gate arrays (FPGAs), etc.

The device 200 may include a network interface 225. The network interface 225 is configured to enable communication with a communication network, using a wired and/or wireless connection.

The device 200 may include memory 220, such as non-transitive, which may include one or more non-volatile storage devices and/or one or more volatile storage devices (e.g., random access memory (RAM)). In instances where the device 200 includes a microprocessor, computer readable program code may be stored in a computer readable medium or memory, such as, but not limited to magnetic media (e.g., a hard disk), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described below and herein. In other embodiments, the device is configured to perform steps described below without the need for code.

It will be recognized by one skilled in the art that these operations, algorithms, logic, method steps, routines, sub-routines, and modules may be implemented in software, in firmware, in special purpose digital logic, and any combination thereof without deviating from the spirit and scope of the present invention as recited within the claims.

The device 200 may include an input device 210. The input device is configured to receive an input from either a user or a hardware or software component. Examples of an input device 210 include a keyboard, mouse, microphone, touch screen and software enabling interaction with a touch screen, etc. The device can also include an output device 215. Examples of output devices 215 include monitors, televisions, mobile device screens, tablet screens, speakers, remote screens, etc. The output device 215 can be configured to display images, media files, text, or video, or play audio to a user through speaker output.

Figure 3:
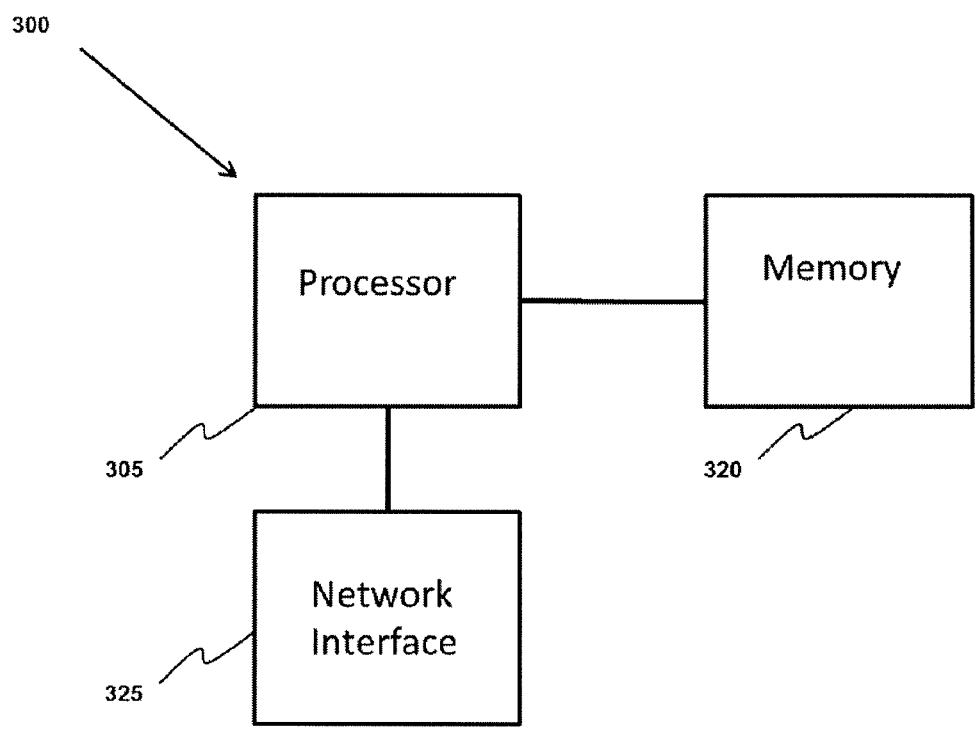
FIG. 3 is a block diagram of a remote device in accordance with exemplary embodiments of the present invention.

Referring now to FIG. 3, a block diagram of a remote device in accordance with exemplary embodiments of the present invention is illustrated. As shown in FIG. 3, the remote device 300 may include a network interface 315 for transmitting and receiving data, a processor 305 for controlling operation of the server device 300, and a memory 310 for storing computer readable instructions (e.g., software) and data. The network interface 315 and memory 310 are coupled to and communicate with the processor 305. Processor 305 controls the operation of network interface 315 and memory 310 and the flow of data and functionality between them. In various embodiments inputs can come from the device 200, to the remote device 300, via the network interface 315. Processing can occur at the remote device 300, at the device 200, or at both. In various embodiments, remote device 300 may be a server.

Processor 305 may include one or more microprocessors, and/or one or more circuits, such as an application specific integrated circuit (ASIC), field-programmable gate arrays (FPGAs), etc. Network interface 225 can be configured to enable communication with a communication network, using a wired and/or wireless connection. Memory 310 can include one or more non-volatile storage devices and/or one or more volatile storage devices (e.g., random access memory (RAM)). In instances where remote device 300 includes a microprocessor, computer readable program code may be stored in a computer readable medium, such as, but not limited to magnetic media (e.g., a hard disk), optical media (e.g., a DVD), memory devices (e.g., random access memory, flash memory), etc. In other embodiments, the device is configured to perform steps described below without the need for code. It will be recognized by one skilled in the art that these operations, logic, method steps, routines, algorithms, sub-routines, and modules may be implemented in software, in firmware, in special purpose digital logic, and any combination thereof without deviating from the spirit and scope of the present invention as recited within the claims attached hereto.

Figure 4:
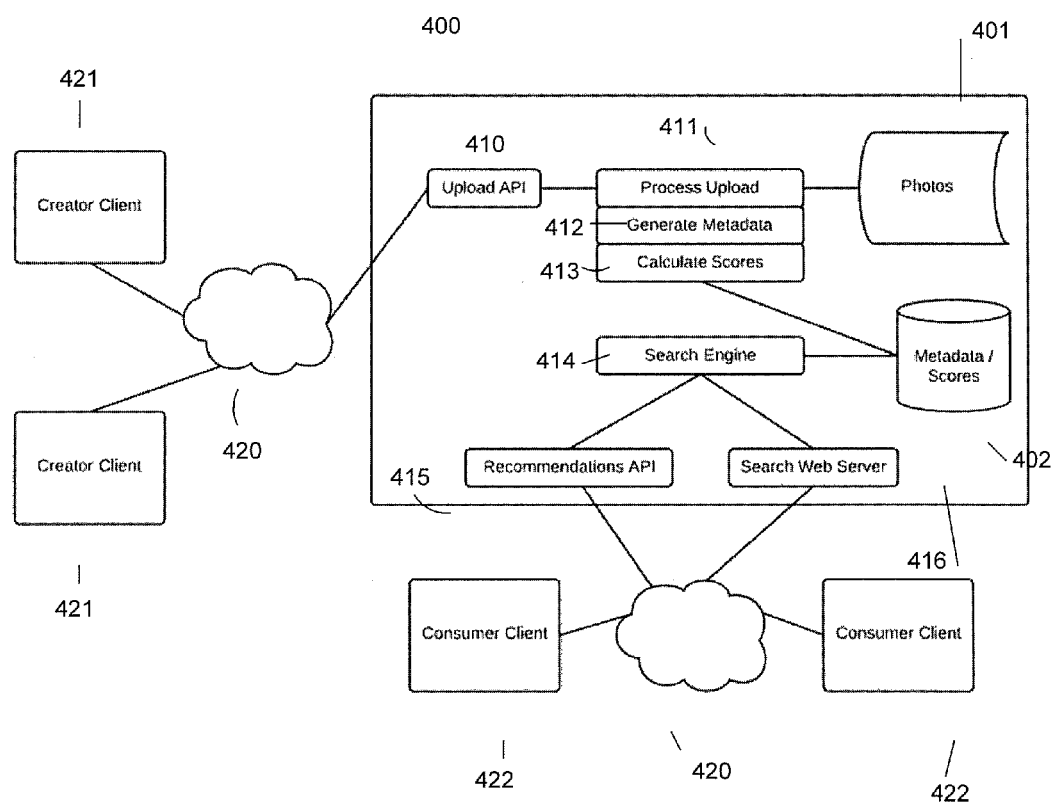
FIG. 4 is a block diagram of an image-processing system in accordance with exemplary embodiments of the present invention.

Referring now to FIG. 4, a block diagram of an image-processing system in accordance with exemplary embodiments of the present invention is illustrated. Users may communicate with the system 400 by a network 420. In certain embodiments, users may be distinguished as being image creators 421 or consumers 422. An image creator 421 may also be a consumer 422, and vice versa. The upload engine 410 allows users to upload images, which are stored. The generate metadata logic 412 automatically generates image-associated metadata (such as tags) by using computer vision methods, analyzing semantic ontologies derived from existing metadata, and analyzing the graph to determine co-occurrence or relevant tags. Scores are also calculated, including an aesthetic score based on the image's aesthetic quality. The search engine 416 processes a search query based on the stored images, the user-associated and image-associated metadata, and the graph. The recommendation engine 415 may display recommendations to a user, for instance, based upon a user's search query and user- and image-associated metadata.

Figure 5:
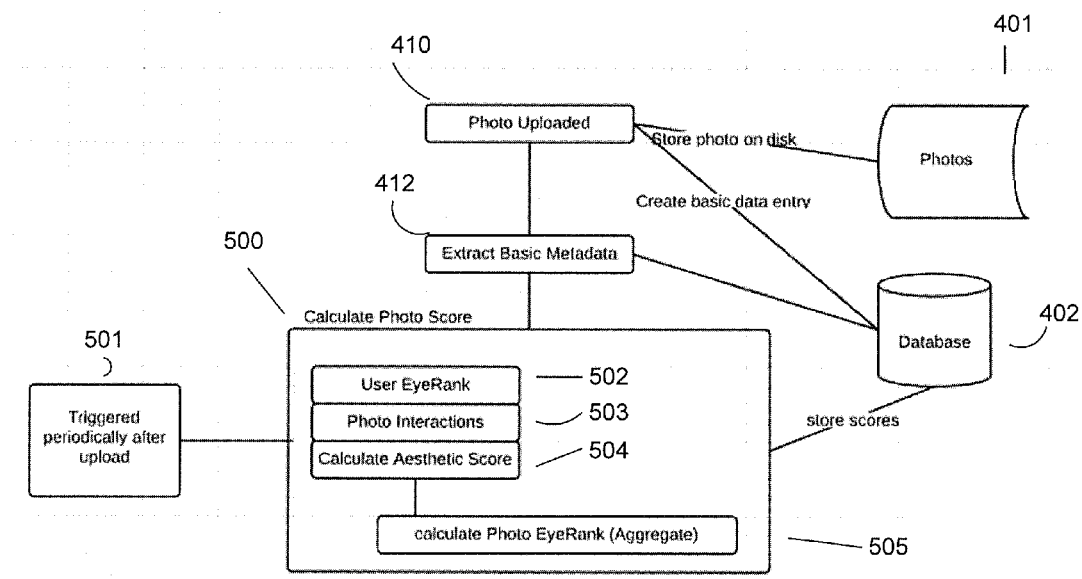
FIG. 5 is a block diagram of an image EyeRank logic in accordance with exemplary embodiments of the present invention.

Referring now to FIG. 5, a block diagram of an image EyeRank logic in accordance with exemplary embodiments of the present invention is illustrated. An image score 505 (called image EyeRank) is generated when an image is uploaded. This is based on at least a user score 502 (called user EyeRank), information about user interactions with the images 503, and an aesthetic score 504 of the image. This image EyeRank is periodically updated, based on changes to the graph such as new interactions and an updated user EyeRank.

Figure 6:
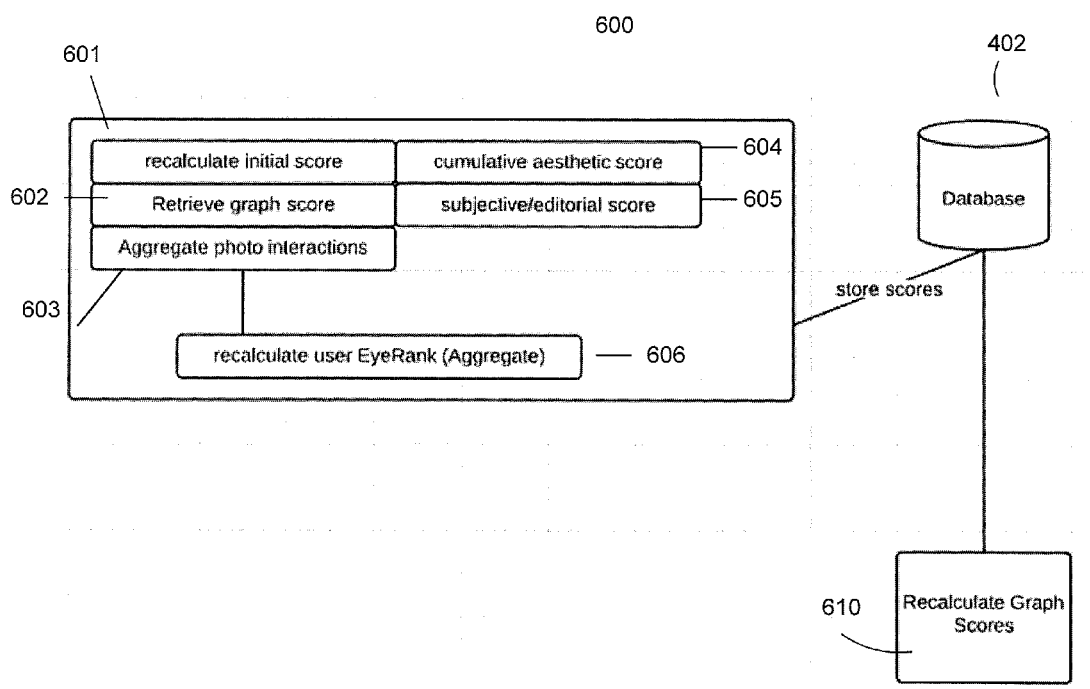
FIG. 6 is a block diagram of a user EyeRank logic in accordance with exemplary embodiments of the present invention.

Referring now to FIG. 6, a block diagram of a user EyeRank logic in accordance with exemplary embodiments of the present invention is illustrated. A user's EyeRank may be calculated based on an initial score, a graph score, an aggregation of the user's interactions with images, an aggregation of aesthetic scores for images belong to the user, and an editorial score.

Figure 7:
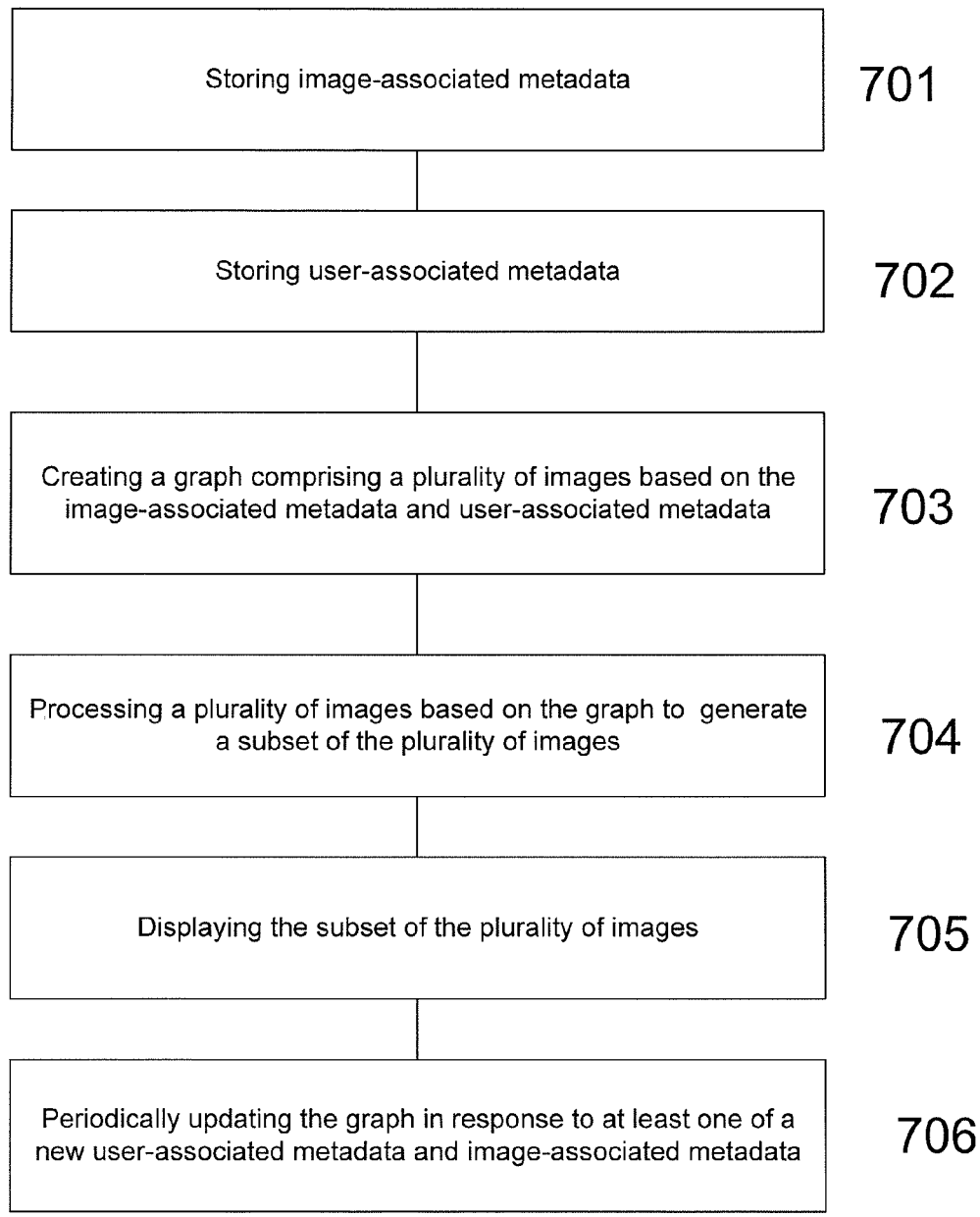
FIG. 7 is a flow diagram illustrating steps of a method for displaying a plurality of images.

FIG. 7 is a flow diagram illustrating steps of a method for displaying a set of images. In an embodiment of the present invention, method 700 for displaying a set of images includes storing image-associated metadata (step 701). In certain embodiments of the present invention, the image-associated metadata comprises a photographer identifier, an aesthetic score, and at least one of a plurality of tags, a plurality of albums, a location information, a time information, a weather information, a plurality of event information wherein the event information concerns events that occurred near at least one of the location information and the time information, a history of views, a history of likes, a history of purchases, and a plurality of computer-generated information. In certain embodiments, the metadata is generated automatically, for instance, by analyzing metadata in an image stored by a camera, using computer vision methods, analyzing semantic ontologies derived from existing user- and image-associated metadata, and analyzing the graph to determine co-occurrence or relevant tags Next, in method 700, user-associated metadata is stored for each user (step 702). In certain embodiments of the present invention, the user-associated metadata comprises a photographer score, an aggregate-image score, a plurality of impact scores, and at least one of a gender, an age, and an activity history.

Next, in method 700, a graph comprising the set of images is created, wherein the graph is based on the image- and user-associated metadata (step 703). In certain embodiments of the present invention, users and images comprise the nodes of the graph and the edges comprise relationships such as "likes" or "follows."

Next, in method 700, the set of images is processed to generate a subset of images (step 704). In certain embodiments of the present invention, the processing a set of images comprises receiving a search query from a user and generating a rank-sorted list of images based on the search query, where the order is based on the user- and image-associated metadata and the graph. In certain embodiments, the set or subset of images may be filtered, based on, for example, tags, locations, time, color space, etc. In certain embodiments, a recommendation is presented to the user, which might consist e.g. of a set of users who took similar images or a set of similar images. This recommendation, in certain embodiments, might be based on information known about the user (e.g. history of views, like, dislikes, location). In certain embodiments, the processing a set of images comprises sorting the images based on information known about the user or based on aesthetic scores of the images.

In some embodiments of the present invention, the processing of images may discard fringe cases like one-time wonder hits, where a limited amount of images get popular due to atypical reasons. By, for example, aggregating multiple scores and accounting for the size of the user's network and the image's reach, the image rating can be adjusted. Likewise, singularly good images can be identified despite the creator having previously contributed lesser quality images, or no images at all. This predictive rating is achieved by analyzing the graph for similar patterns to those of highly-rated users and by analyzing the image itself aesthetically.

In some embodiments of the present invention, the processing of images may be done within specific clusters, e.g. identifying the best photographers of a certain age or from a certain region, or the best images taken at a specific time or place, or are of a particular object or concept. The processing may also take into account the user's demographic information, previous searches, and the types of content the user previously created or interacted with. In some embodiments of the present invention, the processing is based on the user score 502 (called user EyeRank). This permits sorting, filtering, searching, and displaying by user, e.g. by a user profile or portfolio.

Next, in method 700, the subset of images is displayed to a user (step 705).

In some embodiments, method 700 includes periodically updating the graph in response to at least one of a new user-associated metadata and image-associated metadata (step 706).

Figure 8:
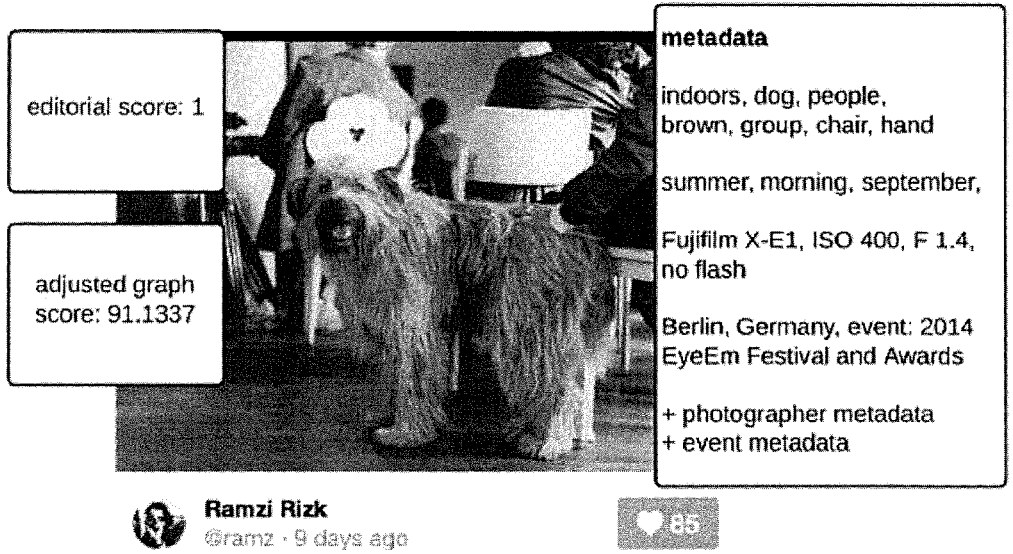
FIG. 8 is a graphical representation of image-associated metadata in accordance with exemplary embodiments of the present invention.

Referring now to FIG. 8, a graphical representation of image-associated metadata in accordance with exemplary embodiments of the present invention is provided. In an embodiment of the present invention, searching a set of images comprises searching metadata associated with a set of images. In an embodiment, an image may have metadata associated with it, including tags (e.g. "indoors," "dog," "people," etc.), event information (e.g. "EyeEm Festival and Awards at Berlin, Germany in 2014"), comments, albums, etc. This might include aggregated information, e.g. "total likes" or "total comments." It might also include scores associated with the image.

Figure 9:
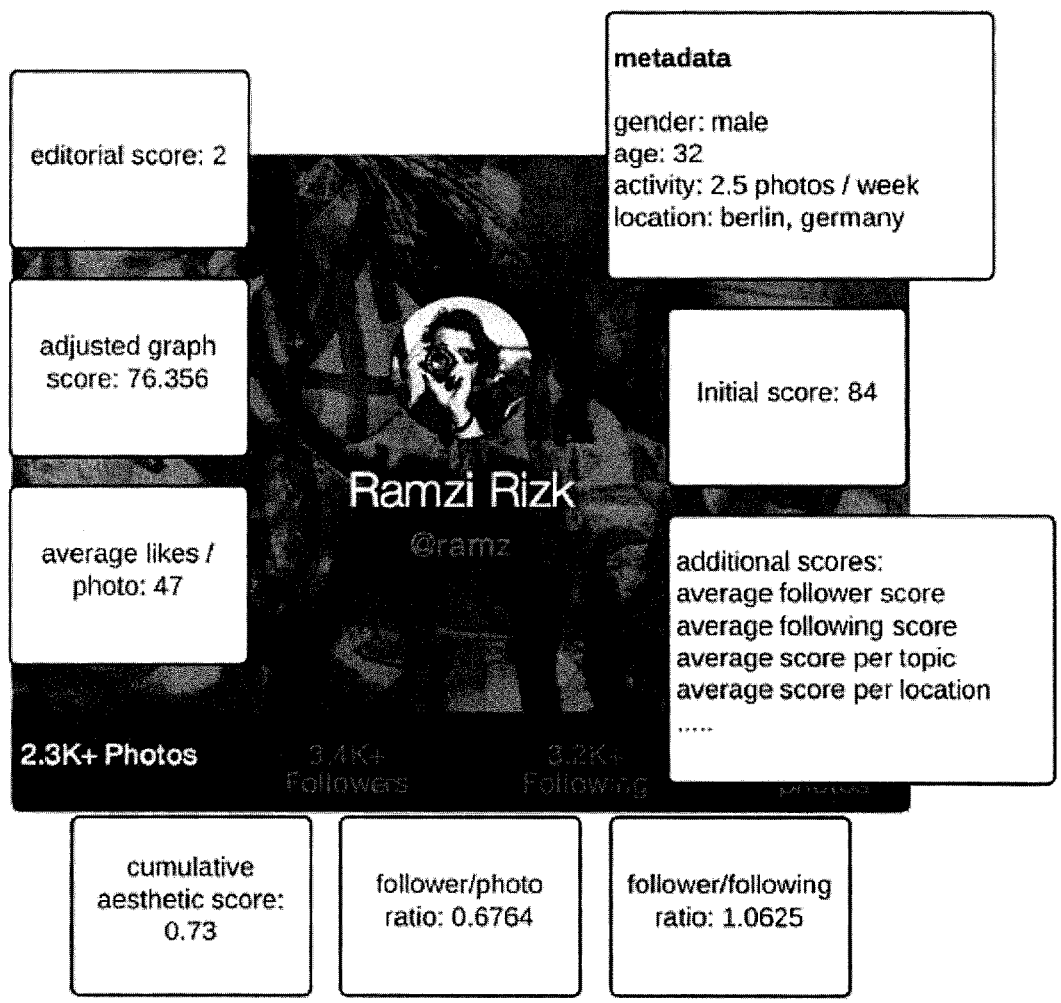
FIG. 9 is a graphical representation of user-associated metadata in accordance with exemplary embodiments of the present invention.

Referring now to FIG. 9, a graphical representation of user-associated metadata in accordance with exemplary embodiments of the present invention is provided. In an embodiment of the present invention, user-associated metadata may include gender (e.g. "male"), age (e.g. "32"), activity (e.g. "2.5 photos/week"), and location (e.g. "berlin, germany"). User-associated metadata might also include an editorial score, an adjusted graph score, average likes per image, a cumulative aesthetic score over all images belonging to the user, a ratio of users following the user and images belonging to the user, and a ratio of users following the user and users being followed by the user.

Figure 10A:
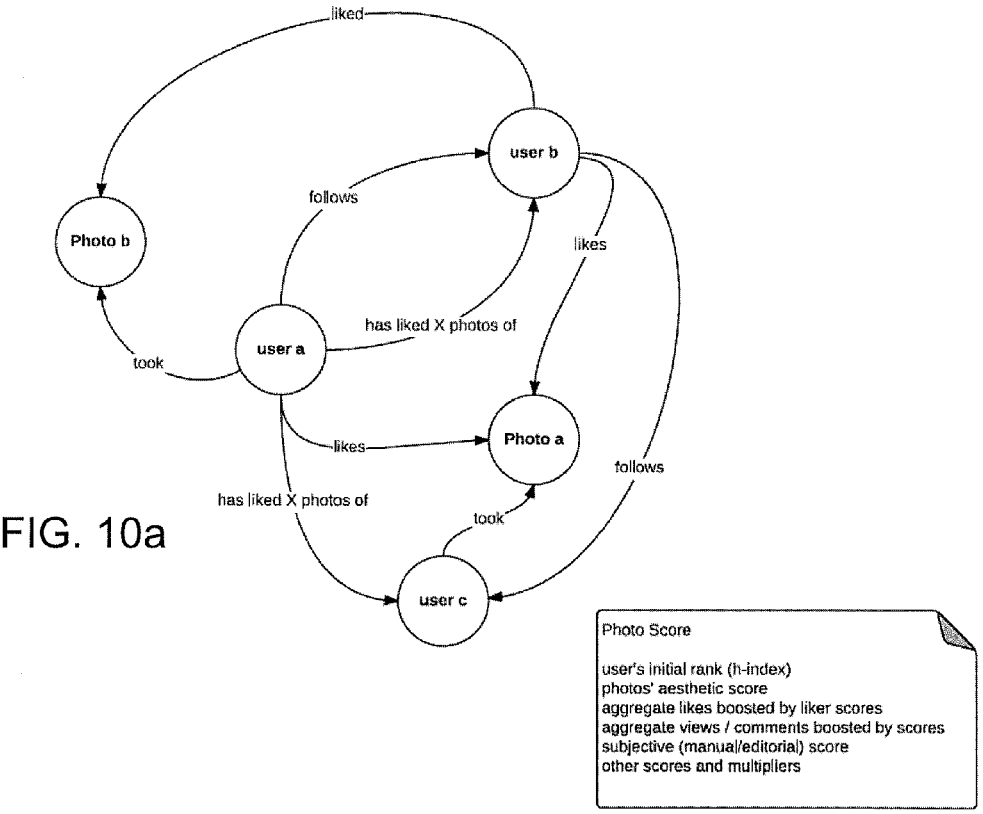
FIG. 10a is a graphical representation of a graph in accordance with exemplary embodiments of the present invention.
Figure 10B:
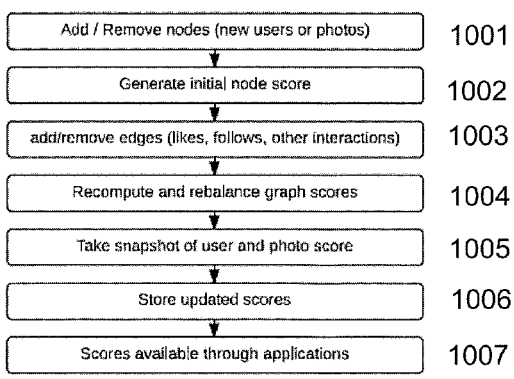
FIG. 10b is a flow diagram illustrating steps of a method for periodically updating a graph in accordance with exemplary embodiments of the present invention.
Figure 10C:
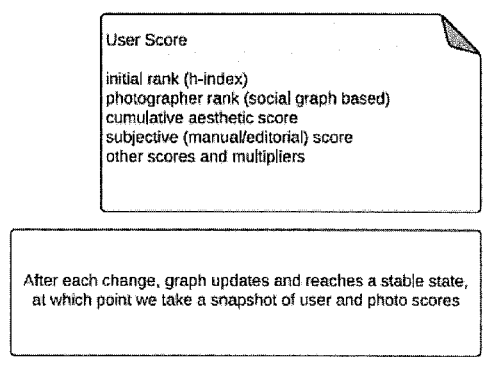
FIG. 10c is a graphical representation of an image score and a photo score in accordance with exemplary embodiments of the present invention.

Referring now to FIGS. 10a-c, a graphical representation of a graph in accordance with exemplary embodiments of the present invention is illustrated. In certain embodiments of the present invention, the nodes of the graph consist of users and images and the edges consist of relationships (e.g. likes, follows). This can include aggregate information, such as how many images of a given user another user has liked.

In some embodiments of the present invention, the graph is continually updated and scores are re-computed to account for the change. For instance, if there is a new user or a new image, a new node will be added; or, if a user or image is removed, the corresponding node will be removed (step 1001). An initial node score is then generated (step 1002). If there is a new relationship (e.g. likes, follows, other interactions), edges may be added, updated, or removed (step 1003). When the graph is changed, the user- and image-specific scores are recalculated (step 1004). This includes taking a snapshot of user and image scores (step 1005). This may also include storing the updated scores (step 1006). This may also involve making the scores available (step 1007).

Figure 11:
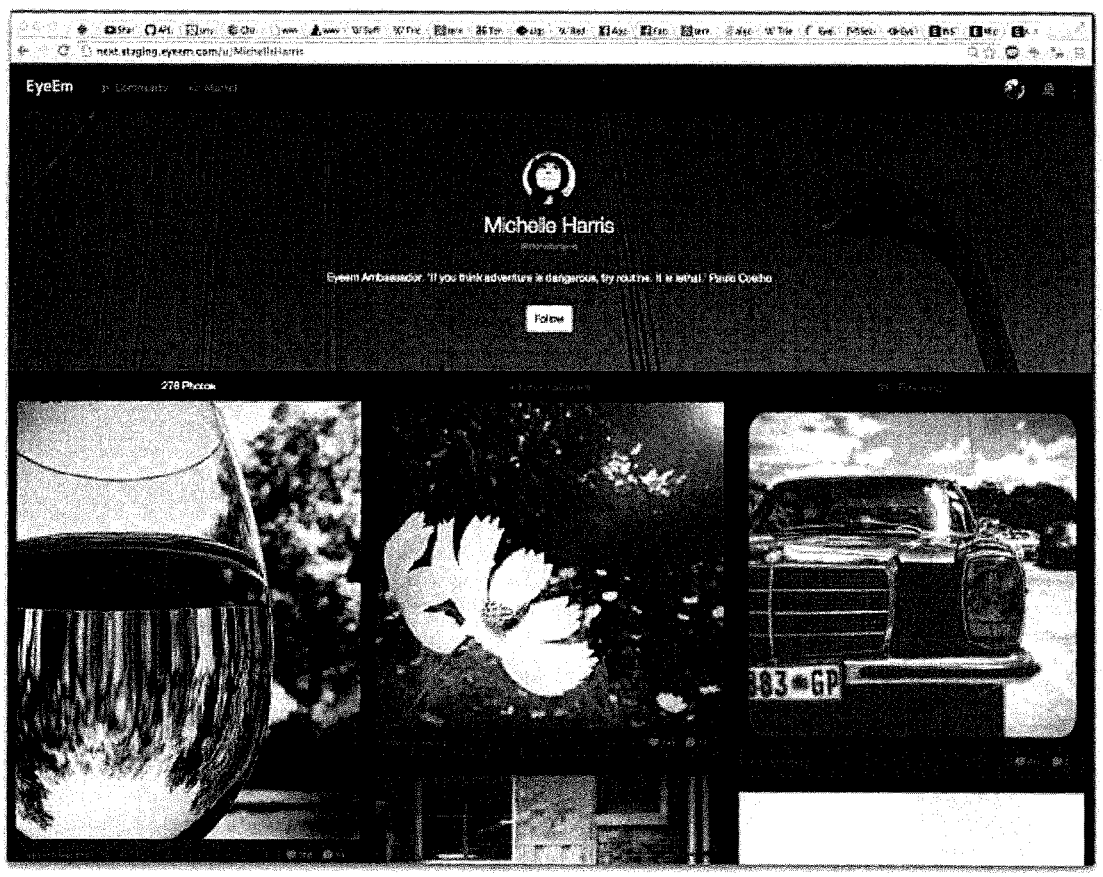
FIG. 11 is an exemplary screen of a user's profile having a high EyeRank in accordance with exemplary embodiments of the present invention.

Referring now to FIG. 11, an exemplary screen of a user's profile having a high EyeRank in accordance with exemplary embodiments of the present invention is illustrated.

Figure 12:
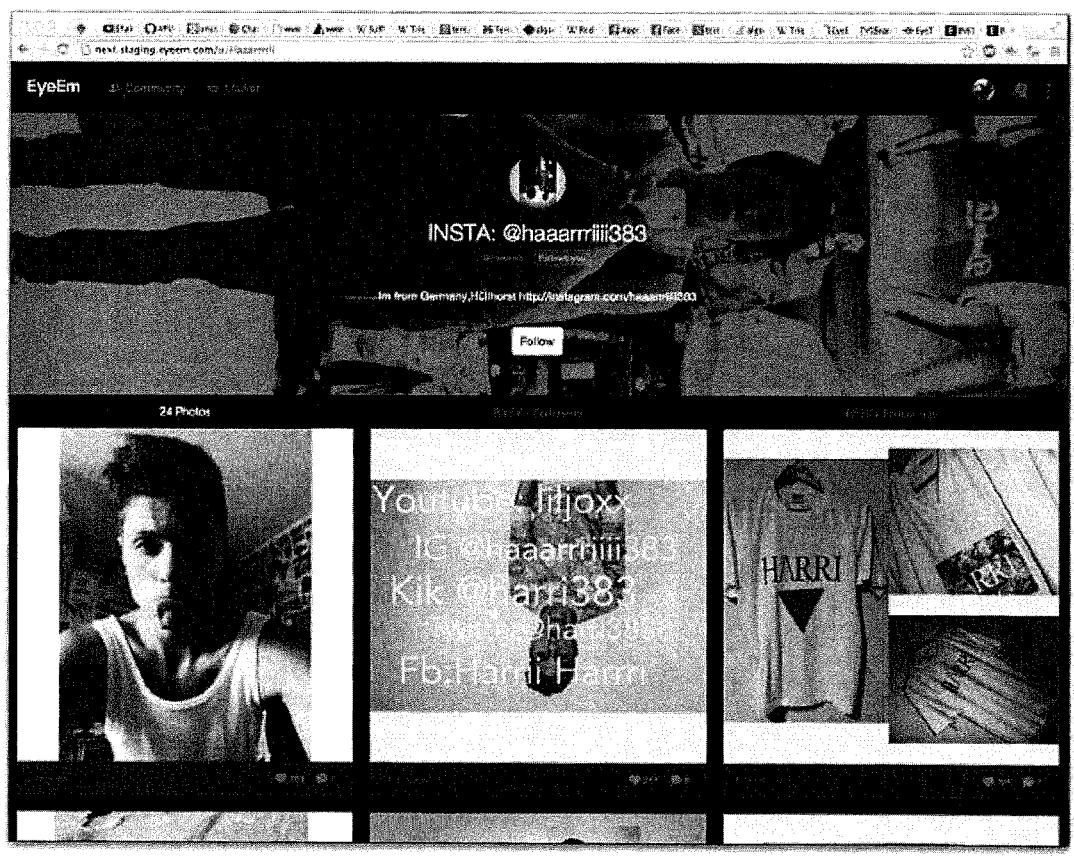
FIG. 12 is an exemplary screen of a user's profile having a low EyeRank in accordance with exemplary embodiments of the present invention.

Referring now to FIG. 12, an exemplary screen of a user's profile having a low EyeRank in accordance with exemplary embodiments of the present invention is illustrated.

In one particular embodiment, users may upload images from a smartphone application (or "app"). The app also allows the users to search or sort a set of images based on aesthetic quality. Users can add metadata to images by interacting with the images, for example, commenting on them, tagging them with keywords, providing event information, liking the image, or putting the image in an album. Users can also follow other users. The app allows users to quickly share and access a large set of images, which they can search, order, or filter, based on aesthetic quality of the image and other factors. The app can be deployed in and used as part of a social network. In other embodiments, users may access upload, search, sort, and view images through a network (e.g. the Internet or a local intranet), for example by using a web browser.

Figure 13:
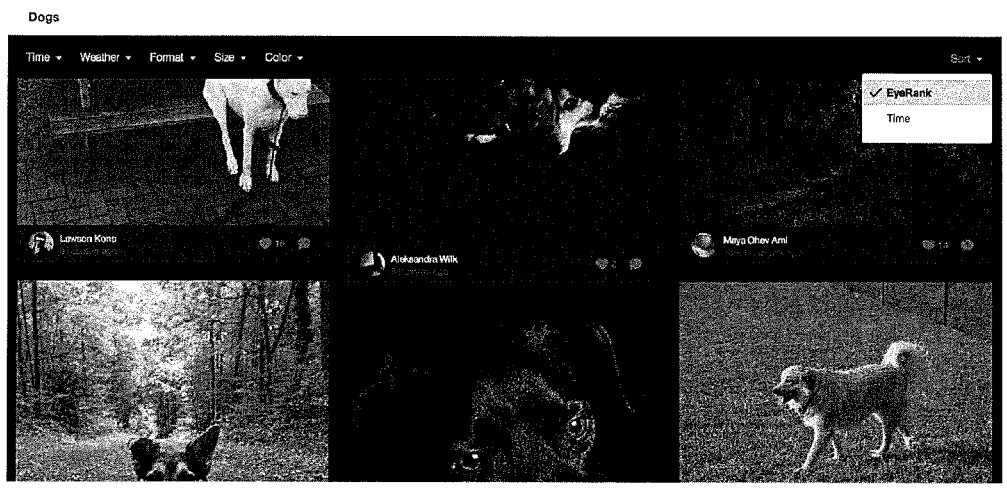
FIGS. 13 and 14 are exemplary screens of a web-based search in accordance with exemplary embodiments of the present invention.
Figure 14:
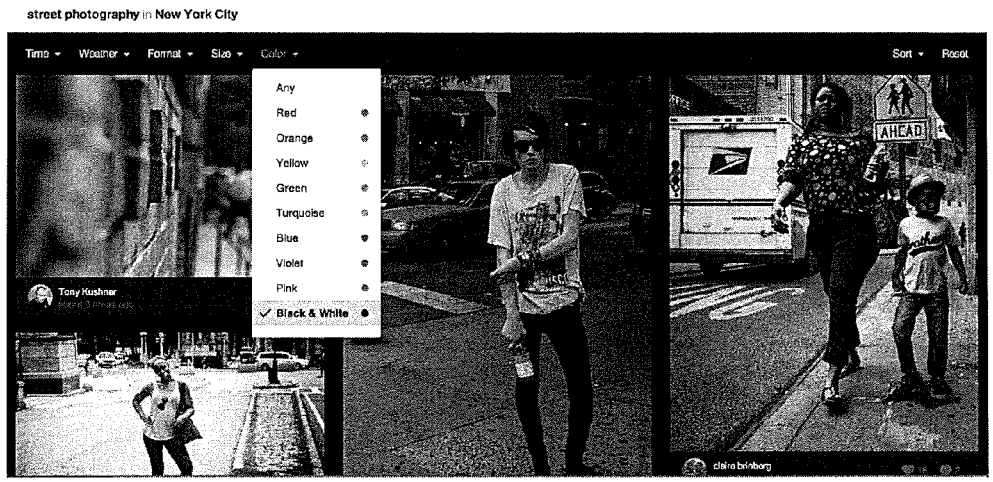

Referring now to FIGS. 13-15c, exemplary screens of a web-based search and a smartphone application in accordance with exemplary embodiments of the present invention are provided. For instance, FIG. 13 shows search results for the query "Dogs" ordered based on an image's "EyeRank" value which is based on an image's aesthetic score. FIG. 14 shows search results for the query "street photography," additionally filtered by geographic location ("New York City") and color property ("Black & White"). FIGS. 15a-c shows multiple screens of an app according to one embodiment of the present invention.

In one particular embodiment of the present invention, a user may quickly, efficiently, and accurately zoom-in on a desired location of an image. A user is able to quickly zoom into an image displayed on a device using a single input action. The single input represents the desired zoom location, indicating where the user wants to center the enlarged image. In response to the user input, the user device requests a high resolution image from a remote device that stores the high resolution image. The user device receives the high resolution image and displays the received image to the user. In one embodiment of the present invention, the user may select a display image from the subset of the plurality of images in order to further select a desired zoom location and have the display image enlarged. Additional aspects of systems, methods, and computer program products for enabling users to better display and view images and, more particularly, to zooming-in to high resolution images with a single user input, are set forth in U.S. application Ser. No. 14/453,185, filed Aug. 6, 2014.

In embodiments where a processor is included, computer readable program code (CRPC) may be stored in a computer readable medium, such as, but not limited to magnetic media (e.g., a hard disk), optical media (e.g., a DVD), memory devices (e.g., random access memory), and the like. In some embodiments, computer readable program code is configured such that when executed by a processor, the code causes the processor to perform steps described above (e.g., steps described above with reference to the flow charts shown in FIGS. 4, 7, and 8).

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

We claim:

1. A method for displaying a plurality of images, comprising:
   a plurality of images;
   a plurality of users;
   for each image, storing image-associated metadata, the image-associated metadata comprising a photographer identifier, an aesthetic score, and at least one of:
      a plurality of tags;
      a plurality of albums;
      a plurality of comments;
      a location information;
      a time information;
      a weather information;
      a plurality of event information wherein the event information concerns events that occurred near at least one of the location information and the time information;
      a history of views;
      a history of likes;
      a history of purchases; and
      a plurality of computer-generated information;
   for each user, storing user-associated metadata, the user-associated metadata comprising a photographer score, an aggregate-image score, a plurality of impact scores, and at least one of a gender, an age, and an activity history;
   creating a graph comprising the plurality of images, wherein the graph is based on the image-associated metadata and the user-associated metadata;
   processing the plurality of images based on the graph to generate a subset of the plurality of images; and
   displaying the subset of the plurality of images.

2. The method of claim 1, wherein the processing the plurality of images comprises:
   receiving a search query from a user; and
   generating a rank-sorted list of images based on the search query, wherein the rank-sorted list of images is ordered based on the image-associated metadata, the user-associated metadata, and the graph comprising the plurality of images.

3. The method of claim 2, further comprising filtering the rank-sorted list of images based on the search query by at least one of the user-associated metadata and the image-associated metadata.

4. The method of claim 1, wherein the processing the plurality of images comprises:
   receiving a request from a user;
   generating, in response to the request, a recommendation to the user based on the graph, the plurality of image-associated metadata, and the plurality of user-associated metadata.

5. The method of claim 4, wherein the recommendation is a plurality of photographer-identifiers.

6. The method of claim 5, further comprising:
   sorting the plurality of photographer-identifiers based on information known about the user.

7. The method of claim 4, wherein the recommendation is a subset of the plurality of images.

8. The method of claim 7, further comprising:
   sorting the subset of the plurality of images based on information known about the user.

9. The method of claim 4, wherein the recommendation is a subset of the plurality of users.

10. The method of claim 4, wherein the request is a search request.

11. The method of claim 4, wherein the recommendation is further based on user-associated metadata belonging to the user.

12. The method of claim 1, wherein the processing the plurality of images comprises:
   identifying a subset of the plurality of images;
   sorting the subset based on the aesthetic scores associated with the images comprising the subset.

13. The method of claim 12, wherein the subset consists of images with similar associated location information.

14. The method of claim 12, wherein the subset consists of images with similar associated pluralities of tags.

15. The method of claim 1, further comprising:
   periodically updating the graph in response to at least one of new user-associated metadata and image-associated metadata.

16. A device for displaying a plurality of images, comprising:
   a processor;
   a memory coupled to the processor;
   a network interface coupled to the process;
   a plurality of users; and
   a plurality of images;
   wherein the processor is configured to:
      store, for each image, image-associated metadata, the image-associated metadata comprising a photographer identifier, an aesthetic score, and at least one of:
         a plurality of tags;
         a plurality of albums;
         a plurality of comments;
         a location information;
         a time information;
         a weather information;

a plurality of event information wherein the event information concerns events that occurred near at least one of the location information and the time information;
a history of views;
a history of likes;
a history of purchases; and
a plurality of computer-generated information;

store, for each user, user-associated metadata, the user-associated metadata comprising a photographer score, an aggregate-image score, a plurality of impact scores, and at least one of a gender, an age, and an activity history;

create a graph comprising the plurality of images, wherein the graph is based on the image-associated metadata and the user-associated metadata;

process the plurality of images based on the graph to generate a subset of the plurality of images; and display the subset of the plurality of images.

17. A computer program product for displaying a plurality of images, said computer program product comprising a non-transitory computer readable medium storing computer readable program code embodied in the medium, said computer program product comprising:
a plurality of images;
a plurality of users; and
program code for storing, for each image, image-associated metadata, the image-associated metadata comprising a photographer identifier, an aesthetic score, and at least one of:

a plurality of tags;
a plurality of albums;
a plurality of comments;
a location information;
a time information;
a weather information;
a plurality of event information wherein the event information concerns events that occurred near at least one of the location information and the time information;
a history of views;
a history of likes;
a history of purchases; and
a plurality of computer-generated information;

program code for storing, for each user, user-associated metadata, the user-associated metadata comprising a photographer score, an aggregate-image score, a plurality of impact scores, and at least one of a gender, an age, and an activity history;

program code for creating a graph comprising the plurality of images, wherein the graph is based on the image-associated metadata and the user-associated metadata;

program code for processing the plurality of images based on the graph to generate a subset of the plurality of images; and program code for displaying the subset of the plurality of images.

* * * * *